United States Patent [19]

Hulsbergen

[11] Patent Number: 4,648,745

[45] Date of Patent: Mar. 10, 1987

[54] METHOD AND DEVICE FOR BURYING A CONDUIT IN THE BOTTOM OF A WATERBED

[75] Inventor: Cornelis H. Hulsbergen, Emmeloord, Netherlands

[73] Assignee: Stichting "Stichting Waterbouwkundig Laboratorium", Delft, Netherlands

[21] Appl. No.: 597,532

[22] Filed: Apr. 6, 1984

[30] Foreign Application Priority Data

Apr. 7, 1983 [NL] Netherlands ..................... 8301230

[51] Int. Cl.$^4$ .............................................. F16L 1/04
[52] U.S. Cl. ..................................... 405/159; 405/158
[58] Field of Search .................. 405/154, 156–159, 405/161, 163, 166, 168, 169, 172, 178, 211, 21, 23, 24, 25; 138/105, 106, 172, 175

[56] References Cited

U.S. PATENT DOCUMENTS

| | | | |
|---|---|---|---|
| 2,674,857 | 4/1954 | Fortes | 138/172 X |
| 2,738,488 | 3/1956 | MacKnight | 405/159 X |
| 3,454,051 | 7/1969 | Goepfert et al. | 405/158 X |
| 3,532,132 | 10/1970 | Rubenstein | 138/172 |
| 3,768,269 | 10/1973 | Broussard et al. | 405/168 |
| 4,044,091 | 8/1977 | Hurst | 405/158 X |
| 4,096,887 | 6/1978 | Streit | 138/172 X |
| 4,171,174 | 10/1979 | Larsen | 405/157 X |
| 4,364,692 | 12/1982 | Kyriakides et al. | 405/169 X |
| 4,374,629 | 2/1983 | Garrett | 405/24 |
| 4,439,058 | 3/1984 | Le Mehauk | 405/24 |

FOREIGN PATENT DOCUMENTS

| | | |
|---|---|---|
| 7101663 | 8/1971 | Netherlands . |
| WO80/00262 | 2/1980 | PCT Int'l Appl. . |
| 357110 | 3/1930 | United Kingdom . |
| 354547 | 8/1931 | United Kingdom . |
| 629078 | 9/1949 | United Kingdom . |
| 1117333 | 6/1968 | United Kingdom . |
| 1201488 | 8/1970 | United Kingdom . |
| 1263791 | 2/1972 | United Kingdom . |
| 1526750 | 9/1978 | United Kingdom . |
| 1531233 | 11/1978 | United Kingdom . |
| 2083603 | 3/1982 | United Kingdom . |

Primary Examiner—Cornelius J. Husar
Assistant Examiner—Nancy J. Stodola
Attorney, Agent, or Firm—Rosen, Dainow & Jacobs

[57] ABSTRACT

For burying conduits in the bottom of a waterbed the invention proposes to provide protruding parts such as fins on or in the proximity of the conduit, which cause disturbances in the flow of water near the conduit to erode the bottom of the waterbed in such a way that the conduit will be buried.

25 Claims, 9 Drawing Figures

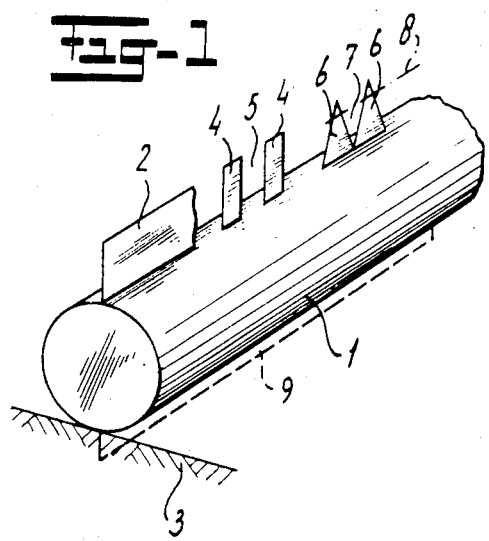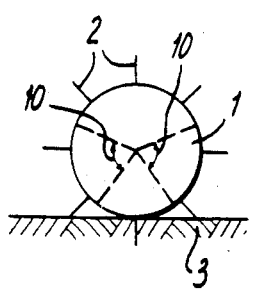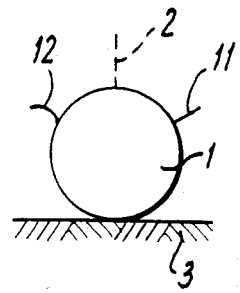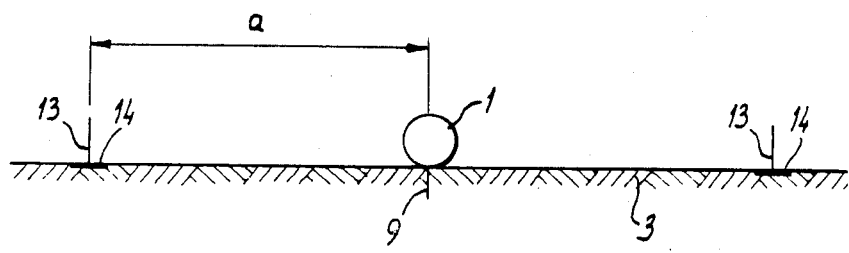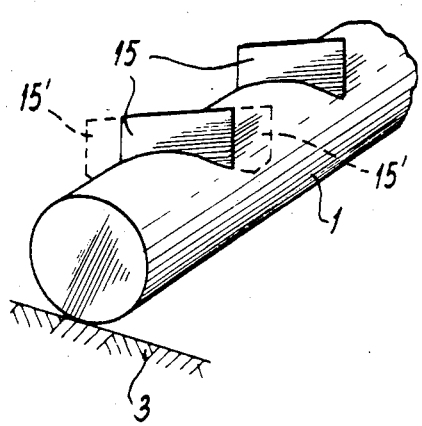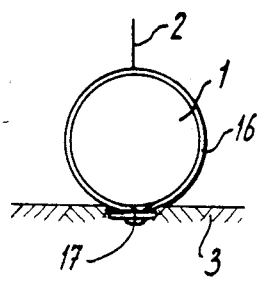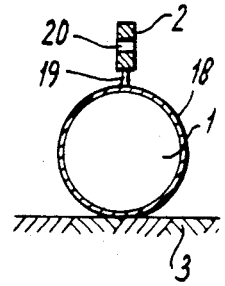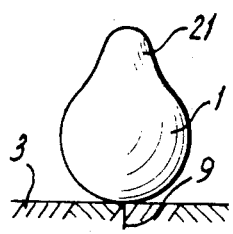

METHOD AND DEVICE FOR BURYING A CONDUIT IN THE BOTTOM OF A WATERBED

This invention relates to a method for burying a conduit such as a pipeline in the bottom of a waterbed and to a device for realizing said method.

It is known to bury all types of conduits such as pipelines in several different manners in the bottom of a waterbed, e.g. in the sea bottom. It is possible thereto to make trenches such as by dredging, by cutting with rotary cutters or by strong water jets and to position the conduit therein. Part of such methods may be realized in such a way that the conduit is lowered to the bottom underwater during the preparation of such a trench. After positioning of the conduit in the trench, the latter may be filled up above the conduit with the material which first has been removed for making the trench so as to obtain sufficient earth material above the conduit, so that it is not again exposed by the stirring action of the water flows along the bottom.

The present invention aims at simplifying such expensive and cumbersome methods. To this end a method as indicated in the preamble above is according to the invention characterized in that said conduit is laid on the bottom and that one or more protruding parts are provided on or in proximity to the conduit, which parts give such a resistance to a horizontal water flow near the conduit that to the side of said part or parts bottom eroding disturbances and/or turbulences are generated in said water flow.

A device for embodying this method is mainly characterized in that it comprises one or more protruding parts on or in the proximity to conduit to be buried so as to cause bottom eroding disturbances and/or turbulences in the horizontal water flow near the conduit. Such protruding parts may be fins, extending axially or in inclined positions with respect to the conduit.

This is based on the insight that with such protruding parts such flow disturbances and turbulences, swirls and eddies can be generated that separate particles of mineral material can be eroded from the bottom thereby to such an extent that the conduit buries itself by its own weight to a sufficient extent and in a reliable and reproducible manner.

It has appeared that a smooth and circular conduit without protrusions often also has the tendency to self-burial, but that this effect often is insufficient, so that the conduit is easily exposed again and/or the time for self-burying is very long, with the inherent danger of damage by anchors, fishing gears or the like. In view thereof several governments require that a conduit be buried so much within one year that there is at least a covering layer of a height of 20 cm above it. The present invention makes it possible to satisfy this standard easily without further auxiliary means, special trenching methods and so on.

It is possible to realize the said method in such a way that the protruding parts are provided at a horizontal distance from the conduit and extending substantially parallel thereto, provided on or in the bottom, and this possibility may be combined with the application of one or more protruding parts on the conduit itself. This is particularly of advantage when the horizontal flows along the bottom in the water are in one direction only instead of switching to and fro by tide currents.

It has appeared that by application of the invention horizontal water flows near the conduit generate flow disturbances and/or turbulences, swirling up, dragging with it and removing the bottom material to the side of and in many cases also below the conduit, so that the conduit sinks into the bottom by its own weight, which process proceeds until the conduit is sufficiently buried, after which the depression, which is thereby formed in the proximity of the conduit, silts up so that so much earth will cover the conduit that it remains buried safely.

When applying the invention, this effect is obtained both when there is a water flow in one direction as with a changing direction of flow e.g. by the tide. Such a flow may deposit the earth material, taken up at one side of the conduit, at the other side thereof again and even in close proximity thereof, but it has appeared that also if there is flow in one direction only so that material is taken up to one side of the conduit and discharged, the conduit will sink to an acceptable depth, although it may tend to tilt which may be possible and acceptable depending on its bending and torsional characteristics. If the conduit may easily tilt to a more considerable extent, it is possible to provide a number of protruding parts, distributed over a greater part of or over the entire periphery of the conduit so that always the parts protruding in a direction to be effective for the erosion generate sufficient disturbance in the water flow for burying erosion.

Perhaps contrary to what one would expect, the application of the invention entails that the erosion at the lee side is at least as important for the burying as the erosion at the luff and possibly the lower-side of the conduit. Often there will initially be a raising of the bottom by deposited material at the lee side immediately behind the part of the conduit protruding above the bottom, with a depression behind it by the lee erosion. At the luff side very soon a downward swirl along the protruding part will be formed, which removes the earth in that zone. For alternating water current said lee erosion depression at some distance from the conduit will form to both sides of the conduit. In particular, for such alternating water flows such depressions are active in directing the water flow in front of and over the conduit in such a way that the burying of the conduit is accelarated by strengthening and intensification of the swirls and eddies, in particular at the luff side but also at the lee side of the protruding parts directly adjacent thereto.

Said swirls at the luff side may be limited in size and stimulated in strength by providing the conduit with an inclined fin positioned to the side of the highest point of the conduit, whether or not together with a fin at the highest point of the conduit.

For an alternating water current (tide) it is possible to provide such an inclined fin to both sides of the vertical central plane of the conduit. Such an inclined fin may deviate from a flat shape by a downward curvature.

Fins as described as such have a clearly favorable effect on the burying even if they have a relatively small radial dimension, e.g. of 0.2 times the diameter of the conduit. In general a larger radial extension means better burying, but there are limits to such an extension by the higher forces exerted by the flow onto the conduit, the higher costs and the disadvantage that e.g. if the fin protrudes to a higher point above the conduit, a larger quantity of earth material may be deposited at the lee side into contact with the conduit.

For this reason it is preferred to embody such fins as open structures if, e.g. in view of the relatively low component of water flow transversely to the conduit or the high resistance to erosion of the bottom material, it is desired to apply fins with a greater radial extension. Such open fins have openings or interruptions, through which part of the water is allowed to pass the conduit in more close proximity to the periphery thereof, so that the flow resistance and thus the forces on the conduit decrease and less material is deposited at the lee side. This may also cause swirls or eddies to be generated behind the closed parts of the fins between the openings having a vertical axis and promoting the burying.

Such interrupted fins may be formed by rods or flat strips of the same width throughout. A particularly good action thereof was obtained by giving them a substantially triangular shape with the base on or close to the conduit. Such parts may be positioned on the conduit immediately one after the other or at larger distances. The triangular shape may be topped or truncated as the sharp pointed end itself will contribute little to the forming of the flow disturbances.

As stated, the invention also includes the possibility to provide protruding parts at a distance to the side of the conduit and to position the conduit itself, whether or not with protruding parts, at such a distance from said protruding parts that the conduit is just positioned in the bottom of the depression formed by said remote protruding parts. The conduit itself sinks gradually with the deepening of said depression and the protruding parts at a distance from the conduit may be removed or bury themselves so that their action to form the depression decreases and finally disappears, after which the depression is silted up and the duct is thus buried. If in that case the conduit itself is also provided with protruding parts according to the invention, preferably with a smaller protrusion from the conduit than without such protruding parts at a distance, the conduit itself has the described action to bury itself in the bottom of said depression formed by said protruding parts at a distance.

For alternating flow such protruding parts at a distance may of course be provided to both sides of the conduit and, if they are positioned at the correct mutual distances, they strengthen and increase their depression-forming activity mutually.

Such protruding parts at a distance preferably have a height of the same order of magnitude as the diameter of the conduit to be buried and not less than half said diameter.

The best mutual distances as measured transversely to the conduit depend among other factors on the speed of flow of the water, the angle of the water flow with respect to the axial direction of the conduit and the nature of the bottom material, but in most cases a distance between 5 and 15 times the diameter of the conduit forms an optimum distance. If the conduit has upstanding protruding parts itself, this distance is 5 to 15 times the highest vertical dimension of the conduit.

As protruding parts at a distance from the conduit to be buried another conduit may also be used, provided that this is positioned at a distance between the centers of the conduits of 3 to 15 times the diameter of the conduit to be buried. If it is desired also to bury said other conduit for a situation of alternating waterflow transversely over the conduits, said conduits help each other to be self buried, even without separate protruding parts thereon. For the diameter of said other conduit, the same is valid as remarked above about the height of the protruding parts at a distance.

It may for several reasons be deemed preferable to provide the conduit at its lower side with one or more downwardly protruding parts such as a vertical longitudinal fin. If the earth below the conduit is very loose, water permeable and easily erodable, it appears that such a protrusion will give the water leaking along the conduit underneath it such an acceleration of flow that this gives a strong erosion so that the conduit buries itself. If it is desired that the conduit be buried deeper or more rapidly than obtainable easily in this way, it is also possible to provide protruding parts as described on higher points of the conduit and/or at a distance thereof in order to cause the erosion phenomena described earlier together with this underneath erosion. Said underneath or "tunnel" erosion often begins most easily on points where the conduit locally is positioned at a short distance above the bottom by local irregularities in the bottom. If the circumstances are not suited for such tunnel erosion it may nevertheless be useful to provide the conduit also with a downwardly directed fin or the like in order to prevent underflow. In many cases this latter possibility is however not necessary and an underflow of the duct, particularly after the burying has begun by sufficient water flow disturbance to the side of the conduit is no more or is hardly a disadvantage and may even be an advantage due to the accelerated burying of the conduit, also by a discharge of material from one side of the conduit along the underside thereof to the side where material has already been removed to a greater extent.

The invention also relates to a further detailing of the principle described above and of the described embodiments as may appear in more detail from the description of the enclosed drawings and from the attached claims.

In said drawings:

FIG. 1 is a vertical section and perspective view of a conduit according to the invention, laid on the sea bottom, showing three different possibilities of embodiment of a longitudinal fin;

FIGS. 2 and 3 show vertical sections through a conduit in another embodiment according to the invention, laid on the sea bottom;

FIG. 4 is a vertical transverse section through a device according to the invention in another embodiment;

FIG. 5 is a vertical cross section and perspective view of a conduit according to the invention in another embodiment;

FIGS. 6, 7 and 8 are vertical cross sections of conduits according to the invention in three other embodiments.

Figure 9:
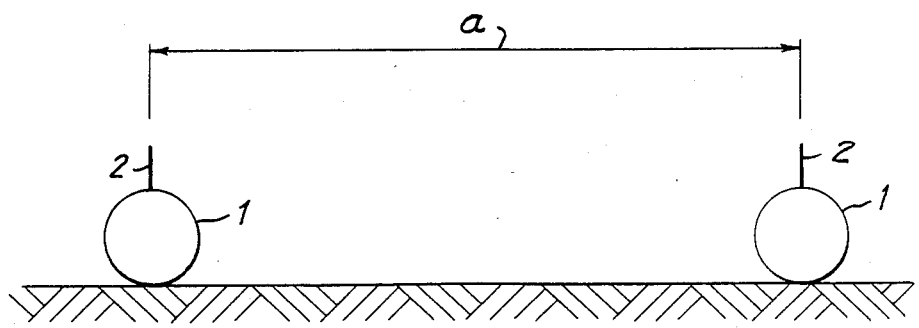
FIG. 9 is a vertical transverse section through an arrangement of conduits according to the invention.

A circular conduit 1 is, as appears from FIG. 1, provided with a longitudinal fin 2 at its highest point and the conduit is thus laid on the sea bottom 3 below water. The longitudinal fin 2 may consist of metal or of a sufficiently strong plastic material and it may be welded to the wall of the conduit or be formed onto a plastic coating layer of the conduit. The longitudinal fin 2 may be a closed continuous fin or have openings, preferably so that strips 4 with openings 5 between them exist, the dimensions of the openings 5 and of the strips 4 in the longitudinal direction of the conduit being of the order of magnitude of the diameter of the conduit and in most cases somewhat greater than shown here.

It is also possible for this fin to consist of triangular strips 6 with openings 7 between them, in which case the strips 6 may be isosceles triangles, truncated, if desired, according to dashed line 8, and with top angles of between 30° and 90°.

The conduit may also have a downwardly extending open or closed fin 9 in its lower point, together with the described protruding parts at the top of the conduit, or, if such fin 9 will give sufficient tunnel erosion as described, instead thereof.

If the conduit is, to such an extent, free to tilt around its axis that considerable deviations in angular position and changes thereof during laying and burying may occur, an embodiment as shown in FIG. 2 is preferred, in which the conduit is provided over its entire periphery with evenly distributed fins 2, closed or interrupted. If the conduit is only tiltable about a smaller angle, it is possible to omit the fins over part of the periphery of the conduit, e.g. over zones of 60° to 90° to both sides especially in the lower side zones of the conduit, e.g. in the angular zones 10 as indicated by dashed lines and in that case it will be preferable to provide more than one fin in the lower part between these zones somewhat closer together.

In order to guide a downwardly directed swirl generated at the luff side and directed downwardly along the wall of the conduit, the embodiment as shown in FIG. 3 will be a good solution. Therein the conduit has a radial longitudinal fin 11 in an inclined position in the upper part e.g. at an angle of about 45° to the horizontal direction. An even better guiding of said swirl may be obtained by curving such a fin concavely downwardly as shown at 12. If the water flow is alternating as by the tide, there will, of course, normally be two such fins 11 or 12 on the conduit.

It is possible to combine this with a fin 2 on the top point of the conduit as indicated by the dashed line in FIG. 3, and in this case such a fin is preferably open as indicated at 4, 5 or 6, 7 in FIG. 1.

In general it is true for all the described embodiments that it is possible to adapt these as to one-sided or two-sided protruding parts to the situation according to whether the flow is directed normally only in one direction or will alternate by the tide and moreover they may or may not be provided with one or more higher fins or a lower fin 9 or both.

In FIG. 4 it is shown how on both sides of a conduit 1 an upstanding protruding part such as a continuous fin 13 is positioned on the sea bottom at a distance a from the conduit to be buried. Each protruding part 13 is positioned on a heavy bottom plate 14. The distance a satisfies the limits as indicated above. The conduit 1 may here also be provided with protruding parts for generating swirls etc. and is here shown as provided with a lower fin 9 as described. A depression will form at the lee side of the fin 13 and the conduit 1 will sink therein, so that with water flow from one direction a single fin 13 has to be provided upstream of the conduit.

FIG. 5 shows how protruding parts 15 may be provided on the conduit 1 at an angle to the longitudinal axis thereof. Such protruding parts are according to the invention preferred for burying a conduit in a case where the direction of water flow along the conduit is mainly not directed transversely thereto. Such protruding parts may be flat or curved, mainly depending on whether the direction of flow has a single dominating preferred direction or will be directed within a wider angular zone of flow during long periods and with sufficient strength in different directions. Such parts may, if desired, also be directed exactly or substantially perpendicularly to the conduit axis and in that case they preferably protrude, as seen from above, to points outside the conduit, as indicated by dashed lines 15', in order to allow the swirls and eddies generated thereby to engage the bottom to the sides of the conduit intimately.

In FIG. 6 it has been shown diagrammatically how a protruding part such as a longitudinal fin 2 may be provided on a wrapper 16 separate from the conduit and extending either over the entire length thereof or only locally along the length by being divided into a number of narrower belts with spaces between these. In such an embodiment it is easy to apply this structure around the conduit and the wrapper may have a connecting and closing structure for the two sides thereof as indicated at 17, which may be formed by buckles, magic fastener belt with burrs and loops or the like, an adhesive or a continuous zip fastener. It is also possible for the wrapper to wrap only a smaller part of the conduit and to be adhered thereto. It is also possible to provide the fin 2 or the like with resilient clips gripping resiliently around the conduit.

If it is desired to remove the fin 2 or the like after burying of the conduit, e.g. by a diver, the closure 17 may be provided more towards the top part of the conduit in proximity to the fin 2 so that it is accessable without much digging.

It has been shown in FIG. 7 that a longitudinal fin 2 or other such protruding part may form one integral unit with a wrapping 18 of a conduit, e.g. a coating of the conduit from a suitable plastic material or artificial rubber, and such a fin or the like may be connected by a narrower part 19 to said wrapping 18. In this embodiment it is posssible to bring a hook or cable through an opening 20 in the fin or the like and to pull so as to tear the fin from the conduit. There need only be one opening 20 for each relatively long part along the length of the fin.

All the earth material which has to be removed to gain access to the protruding parts for removing them will, of course, temporarily result in a local opening in the sea bottom, but this will silt up rapidly. The removal of such a fin or the like may be preferable in order to avoid the fin coming into contact with anchors and other parts which may move along the bottom, and also to take away the source of turbulence after the duct has been buried. Also when the conduit is present in an eroded depression as described, e.g. formed by the protruding parts of FIG. 4, it may be useful to remove the fin or to remove the protruding part present at a distance from the conduit such as 13 to promote silting up of said depression.

All conduits may have anti-corrosive, heat-insulating or other coatings as known and usual and the protruding parts according to the invention may also be coated if desired. They may be connected to the conduit before said coating is applied, e.g. by welding, or in a later stage. The protruding parts mode e.g. from plastic material may, if desired, be so flexible or may be connected to the conduit through such flexible connecting parts that they produce less risk of being damaged by collisions. They may even be so flexible that during conveying of the conduit to the site they may be folded back onto the conduit to facilitate manipulation thereof.

All drawings are diagrammatic as to wall thickness, coating of the conduit, interior parts thereof such as separate pipelines etc.

In FIG. 8 a conduit 1 is shown, which itself by a deviation from a circular cross section generates sufficient turbulence to make it self-burying. In this case the conduit has the shape of a pear with a rather narrow and upwardly protruding part 21, which may, if desired, be combined with an upstanding fin on top thereof, but in most cases the latter will not be necessary.

FIG. 9 shows yet another embodiment of the invention whereby at least two conduits are positioned in a substantially parallel spaced relationship on the sea bottom. The distance a between the centers of the two parallel conduits is equal to 3 to 15 times the largest vertical dimension of the conduits.

I claim:

1. A method for burying a conduit such as a pipeline which is laid on the bottom of a water bed over which a substantially horizontal water flow occurs, comprising the step of providing a first protruding part which is arranged in the path of said water flow, said first protruding part being disposed to provide resistance to said water flow and being securely connected to said conduit, and the projection of said first protruding part on a plane transverse to the direction of said water flow having sufficiently large dimensions such that disturbances and/or turbulences which erode said bottom adjacent to and underneath said conduit are increased by said first protruding part.

2. A method for burying a conduit such as a pipeline which is laid on the bottom of a water bed over which a substantially horizontal water flow occurs, comprising the step of providing a first protruding part which is arranged in the path of said water flow, said first protruding part being disposed to provide resistance to said water flow, and said first protruding part being located sufficiently close to said conduit and the projection of said first protruding part on a plane transverse to the direction of said water flow having sufficiently large dimensions such that disturbances and/or turbulences which erode said bottom adjacent to and underneath said conduit are increased by said first protruding part.

3. The method of claim 2, wherein said first protruding part is laid on said bottom at a horizontal distance from said conduit and extending substantially parallel thereto.

4. A device for burying a conduit such as a pipeline which is laid on the bottom of a water bed over which a substantially horizontal water flow occurs, comprising a first protruding part which is arranged in the path of said water flow, said first protruding part being disposed to provide resistance to said water flow and being securely connected to said conduit, and the projection of said protruding part on a plane transverse to the direction of said water flow having sufficiently large dimensions such that disturbances and/or turbulences which erode said bottom adjacent to and underneath said conduit are increased by said first protruding part.

5. The device of claim 4, wherein said first protruding part comprises a longitudinal fin.

6. The device of claim 5, wherein said longitudinal fin is provided with openings for the passage of water therethrough.

7. The device of claim 4, further comprising a second protruding part, said first and second protruding parts in turn comprising first and second fins respectively, said first and second fins being arranged in the same plane and being separated by a predetermined distance.

8. The device of claim 7, wherein said first and second fins are mounted along the highest points of said conduit.

9. The device of claim 5, wherein said fin is mounted on said conduit along a line parallel to a longitudinal axis of said conduit such that said fin is disposed at a predetermined angle with respect to a direction vertical to said bottom, said line being displaced with respect to the longitudinal line of highest points of said conduit.

10. The device according to claim 9, wherein said fin is curved outwardly downward.

11. The device according to claim 9, further comprising a second protruding part, said second protruding part comprising a longitudinal fin mounted along the longitudinal line of highest points of said conduit and disposed in a direction vertical to said bottom, wherein said vertical fin has interruptions and said inclined fin is substantially continuous.

12. The device according to claim 4, comprising a plurality of protruding parts, each of said protruding parts comprising a longitudinal fin, said longitudinal fins being distributed around the entire periphery of said conduit.

13. The device of claim 12, wherein one of said longitudinal fins extends downwardly from the lowest part of said conduit.

14. The device of claim 4, wherein said first protruding part is provided on the top part of said conduit and is disposed at an angle with respect to a longitudinal axis of said conduit.

15. The device of claim 4, wherein said first protruding part is detachably mounted on said conduit.

16. The device of claim 15, wherein said strap comprises a flexible belt wrapped around and adhered to said conduit.

17. The device of claim 4, wherein said first protruding part is connected to said conduit by means of a weakened tearing edge.

18. The device of claim 4, wherein said first protruding part is flexible.

19. The device of claim 4, wherein said first protruding part comprises a substantially planar fin.

20. The device of claim 4, wherein said first protruding part is a hump integrally formed on said conduit, said conduit thus having a pear-shaped cross section.

21. A device for burying a first conduit such as a pipeline which is laid on the bottom of a water bed over which a substantially horizontal water flow occurs, comprising a first protruding part which is arranged in the path of said water flow, said first protruding part being disposed to provide resistance to said water flow, and said first protruding part being located sufficiently close to said first conduit and the projection of said protruding part on a plane transverse to the direction of said water flow having sufficiently large dimensions such that disturbances and/or turbulences which erode said bottom adjacent to and underneath said first conduit are increased by said first protruding part.

22. The device of claim 21, wherein said first protruding part is mounted on a flat supporting body of relatively large surface area, said flat supporting body being located on said bottom at a predetermined distance from said conduit.

23. The device of claim 21, wherein said first protruding part comprises a substantially planar fin.

24. The device of claim 21, wherein said first protruding part is securely connected to a second conduit laid on the bottom of said water bed in parallel with said first conduit.

25. The device of claim 24, wherein a second protruding part is securely connected to said first conduit, the projection of said second protruding part on a plane transverse to the direction of said water flow having sufficiently large dimensions such that disturbances and/or turbulences which erode said bottom adjacent to and underneath said second conduit are increased by said second protruding part.

* * * * *